United States Patent
Carlesimo et al.

(10) Patent No.: US 9,914,414 B2
(45) Date of Patent: Mar. 13, 2018

(54) FLUID LEVEL INDICATION FOR VEHICLE RESERVOIRS

(71) Applicant: GM GLOBAL TECHNOLOGY OPERATIONS LLC, Detroit, MI (US)

(72) Inventors: Daniel P. Carlesimo, Macomb Township, MI (US); Marcelo V. Lazarini, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/195,188

(22) Filed: Jun. 28, 2016

(65) Prior Publication Data

US 2017/0369008 A1  Dec. 28, 2017

(51) Int. Cl.
  *B60R 16/023*  (2006.01)
  *G01F 9/00*  (2006.01)

(52) U.S. Cl.
  CPC .......... *B60R 16/0234* (2013.01); *G01F 9/001* (2013.01)

(58) Field of Classification Search
  CPC ............................ B60R 16/0234; G01F 9/001
  USPC ........................................................ 701/33.9
  See application file for complete search history.

(56) References Cited

U.S. PATENT DOCUMENTS

| | | | | |
|---|---|---|---|---|
| 4,020,683 A * | 5/1977 | Young | ................ | G01F 9/001 251/129.05 |
| 5,947,372 A * | 9/1999 | Tiernan | ................ | G01F 23/34 116/227 |
| 6,002,328 A * | 12/1999 | Wallrafen | ................ | B60K 15/06 340/450 |
| 6,397,668 B1 * | 6/2002 | Davison | ................ | G01F 9/001 73/114.52 |
| 9,732,714 B2 * | 8/2017 | Anderson | ................ | F02M 37/221 |
| 2006/0190149 A1 * | 8/2006 | LaPant | ................ | B60K 15/06 702/182 |
| 2006/0278283 A1 * | 12/2006 | Gouzou | ................ | F02D 19/12 137/571 |
| 2010/0089037 A1 * | 4/2010 | Bogema | ................ | F01N 3/2066 60/286 |
| 2011/0226362 A1 * | 9/2011 | Oxley | ................ | B60K 15/03006 137/572 |
| 2013/0284675 A1 * | 10/2013 | Core | ................ | B01D 17/0202 210/691 |
| 2014/0318497 A1 * | 10/2014 | Balloul | ................ | F02D 19/0665 123/445 |
| 2014/0360260 A1 * | 12/2014 | Dudar | ................ | G01F 23/22 73/204.11 |
| 2015/0006059 A1 * | 1/2015 | Castleberry | ................ | G01N 33/2835 701/102 |

(Continued)

*Primary Examiner* — Atul Trivedi
(74) *Attorney, Agent, or Firm* — Reising Ethington, P.C.

(57) ABSTRACT

A system and method are provided for estimating a fluid level in a reservoir disposed in a vehicle compartment having a compartment cover. The method includes monitoring at least one operational parameter relating to the reservoir, monitoring a state of the compartment cover using a sensing device, detecting a triggering event based on the at least one operational parameter, the state of the compartment cover, or both, and in response to the triggering event, determining an estimate for an amount of fluid in the reservoir based on data related to the triggering event, and initiating a notification to a vehicle occupant when the estimated amount of fluid in the reservoir is less than or equal to a low level threshold.

21 Claims, 2 Drawing Sheets

(56) References Cited

U.S. PATENT DOCUMENTS

| | | | | |
|---|---|---|---|---|
| 2015/0013451 A1* | 1/2015 | Van Der Linde | G01F 17/00 | 73/195 |
| 2015/0019066 A1* | 1/2015 | Dudar | F02M 25/0809 | 701/29.7 |
| 2015/0192450 A1* | 7/2015 | Leone | G01F 23/14 | 701/36 |
| 2015/0211914 A1* | 7/2015 | Dudar | G01F 23/246 | 73/292 |
| 2016/0033293 A1* | 2/2016 | Nobrega | G01C 21/3415 | 701/423 |
| 2017/0081997 A1* | 3/2017 | Potyrailo | G01N 33/2888 | |
| 2018/0017430 A1* | 1/2018 | Aghili | G01F 25/0061 | |

* cited by examiner

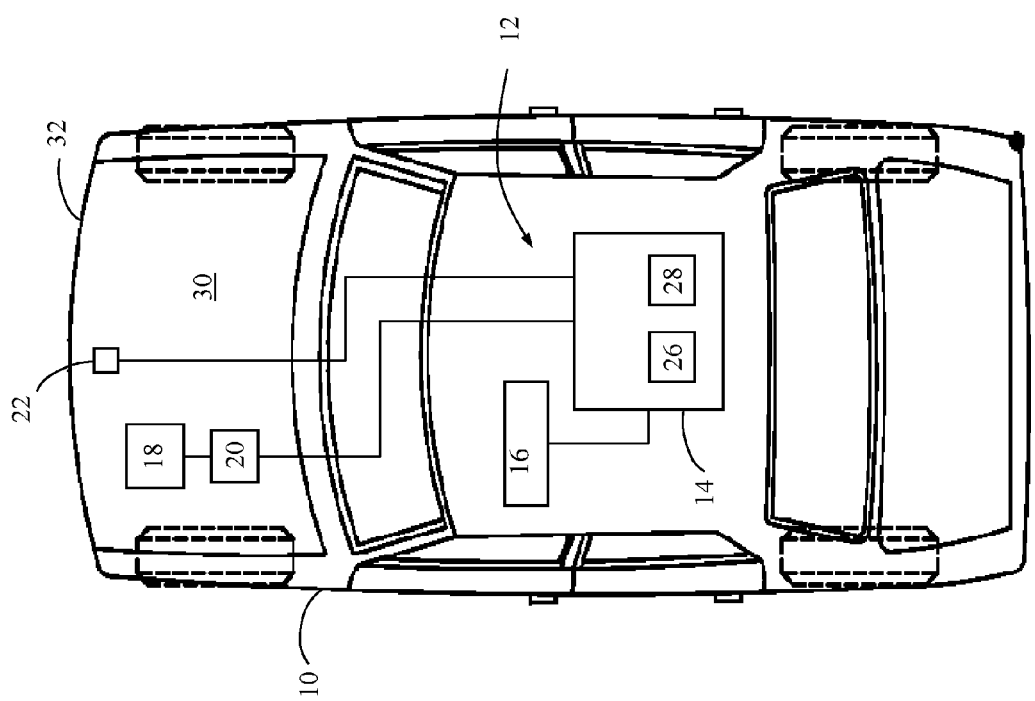

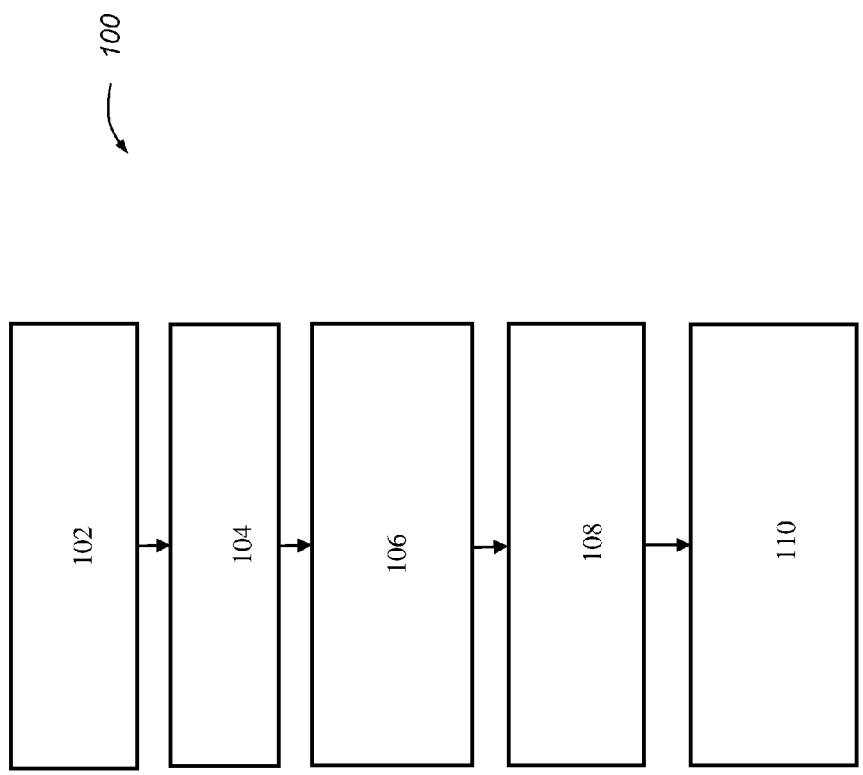

FLUID LEVEL INDICATION FOR VEHICLE RESERVOIRS

FIELD

The present invention generally relates to vehicle systems and, more particularly, to a system and method for estimating fluid reservoir levels without the use of dedicated reservoir sensors.

BACKGROUND

Vehicle compartments, such as engine compartments, contain a variety of different reservoirs used to store various vehicle fluids. To reduce vehicle costs, some of those fluid reservoirs, especially in emerging markets, do not contain any kind of sensing device to indicate when a low fluid level has been reached (e.g. washer reservoirs or gasoline reservoirs in certain vehicle markets). Therefore, the customer does not know when to fill the reservoir unless the compartment cover (e.g., hood for engine compartments) is opened for inspection, or the functionality of the vehicle is compromised due to a lack of fluids.

A low fluid level in a reservoir can be particularly problematic in emerging markets where sensing devices are often not included to keep vehicle costs low. For example, flexible-fuel vehicles (FFV) or dual-fuel vehicles (colloquially called flex-fuel vehicles), prevalent in markets like Brazil, are alternative fuel vehicles that have an internal combustion engine designed to run on more than one fuel—usually gasoline blended with either ethanol or methanol fuel, and both fuels are stored in the same common tank. Modern flex-fuel engines are capable of burning any proportion of the resulting blend in the combustion chamber as fuel injection and spark timing are adjusted automatically according to the actual blend detected by a fuel composition sensor. Flex-fuel vehicles are distinguished from bi-fuel vehicles, where two fuels are stored in separate tanks and the engine runs on one fuel at a time, for example, compressed natural gas (CNG), liquefied petroleum gas (LPG), or hydrogen.

North American and European flex-fuel vehicles are generally optimized to run on E85, a blend of 85% anhydrous ethanol fuel with 15% gasoline. This upper limit in the ethanol content is set to reduce ethanol emissions at low temperatures and to avoid cold starting problems during cold weather, at temperatures lower than 11° C. (52° F.). The alcohol content is reduced during the winter in regions where temperatures fall below 0° C. (32° F.) to a winter blend of E70 in the United States. However, Brazilian flex fuel vehicles are optimized to run on any mix of E20-E25 gasoline and up to 100% hydrous ethanol fuel (E100) so the Brazilian flex vehicles are generally equipped with a small gasoline reservoir for cold starting the engine when temperatures drop below 15° C. (59° F.). In these markets, it's important to know when there is a low fluid level in the reservoirs; otherwise, the vehicle may not start in cold weather scenarios.

It would be advantageous to have the ability to monitor reservoir fluid levels in these emerging market vehicles without the use of additional sensors, which adds to the cost and complexity of the vehicle.

SUMMARY

According to one embodiment, there is provided a method for estimating a fluid level in a reservoir disposed in a vehicle compartment having a compartment cover. The method includes monitoring at least one operational parameter relating to the reservoir, monitoring a state of the compartment cover using a sensing device, detecting a triggering event based on the at least one operational parameter, the state of the compartment cover, or both, and in response to the triggering event, determining an estimate for an amount of fluid in the reservoir based on data related to the triggering event, and initiating a notification to a vehicle occupant when the estimated amount of fluid in the reservoir is less than or equal to a low level threshold.

According to another embodiment, there is provided a method for estimating a fluid level in a reservoir disposed in a vehicle compartment having a compartment cover. The method includes detecting an activation of a supply mechanism coupled to the reservoir and configured to expel the fluid therefrom, detecting a threshold transition cycle between a closed position and an open position of the compartment cover, determining an estimate for an amount of fluid in the reservoir in response to detecting the activation of the supply mechanism, detecting the threshold transition cycle, or both, and initiating a notification to a vehicle occupant when the estimated amount of fluid in the reservoir is less than or equal to a low level threshold.

According to another embodiment, there is provided a system for estimating a fluid level in a reservoir disposed in a vehicle compartment having a compartment cover. The system includes a supply mechanism coupled to the reservoir and configured to expel the fluid therefrom, a sensing device configured to monitor a state of the compartment cover, at least one vehicle control module communicatively coupled to the sensing device and to the supply mechanism and configured to: detect an activation of the supply mechanism, detect a threshold transition cycle between a closed position and an open position of the compartment cover, determine an estimate for an amount of fluid in the reservoir in response to detecting the activation of the supply mechanism, detecting the threshold transition cycle, or both, and initiate a notification to a vehicle occupant when the estimated amount of fluid in the reservoir is less than or equal to a low level threshold.

DRAWINGS

Preferred exemplary embodiments will hereinafter be described in conjunction with the appended drawings, wherein like designations denote like elements, and wherein:

FIG. 1 is a block diagram depicting an embodiment of a communications system that is capable of utilizing the method disclosed herein; and FIG. 2 a flow chart illustrating an exemplary embodiment of the method disclosed herein.

DESCRIPTION

The system and method described below are directed to estimating fluid levels in reservoirs, and more specifically, to a system that implements a method for estimating fluid levels in reservoirs without the use of dedicated reservoir sensors. In one embodiment, the method updates a parameter representing a value for an estimated amount of fluid remaining in the reservoir (e.g., a remaining fluid parameter) based on a detection of a triggering event. The triggering event represents an action that indicates that the fluid in the reservoir is being expelled and/or replenished. When detecting a triggering event, the method updates the remaining fluid parameter for the reservoir based on the type of triggering event. In other words, the remaining fluid parameter is decreased or increased, respectively, based on whether the triggering event indicates that fluid in the reservoir is being expelled or replenished.

With respect to expelling the fluid from the reservoir, the triggering event may be related to an operational parameter associated with the reservoir. For example, the reservoir may be operatively connected to a supply mechanism that, when activated, extracts fluid from the reservoir and transports the extracted fluid to another vehicle component. In one embodiment, the supply mechanism may be a pump that transports the fluid from the reservoir to the designated vehicle component through one or more conduits. Thus, the triggering event in this case is the activation of the pump. The amount of the fluid expelled from the reservoir (i.e., the amount of fluid expelled from the reservoir) during the triggering event is estimated using data relating to a plurality of operational parameters specific to the reservoir. In one embodiment, the operational parameters may relate to characteristics of the pump, the conduit, and the type of fluid. The estimated amount of fluid expelled from the reservoir during the activation period of the pump is used to update the remaining fluid parameter. In one embodiment, the remaining fluid parameter is updated by decreasing the current (i.e., the last known and/or most recently updated) value for the estimated fluid level in the reservoir by the amount of fluid expelled from the reservoir during the activation period from.

With respect to replenishing the fluid in the reservoir, the triggering event may be related to detecting a particular type of access to the vehicle compartment in which the reservoir is disposed. In one embodiment, the reservoir may be disposed in the vehicle engine compartment, which is accessed through the vehicle hood. Using a sensing device, the system monitors access to the engine compartment to determine a state of the vehicle hood (i.e., when the vehicle hood is opened and/or closed). The sensing device may include a timing function to track the opening and closing times of the vehicle hood. The method uses the opening and closing times to identify a threshold transition cycle in which a closed vehicle hood is opened and remains in an open position for a minimum period of time prior to being closed. In one embodiment, the threshold transition cycle is a triggering event that represents an access scenario in which the engine compartment is accessed for time period that is sufficient to allow the reservoir to be replenished. In other words, when a threshold transition cycle is identified and it satisfies the reset criteria, the method presumes that the fluid in the reservoir has been replenished to the reservoir capacity, and sets the value associated with the estimated remaining fluid parameter equal to the reservoir capacity volume. Stated another way, when a threshold transition cycle is detected, a full reservoir is assumed and the estimated remaining fluid parameter is updated so that the value of the estimated remaining fluid in the reservoir is equal to the volume of the reservoir capacity.

When the estimated remaining fluid in the reservoir is less than or equal to a low fluid level threshold, a warning flag is set that initiates a notification to the vehicle occupant.

System—

With reference to FIG. 1, there is shown an exemplary embodiment of a vehicle 10 having a communications system 12. Vehicle 10 is depicted in the illustrated embodiment as a passenger car, but it should be appreciated that any other vehicle including motorcycles, trucks, sports utility vehicles (SUVs), recreational vehicles (RVs), semi-trucks, etc. can also be used. Communications system 12 includes a control module 14, an interface 16, a reservoir 18, a supply mechanism 20, and a sensing device 22. The control module 14 is directly or indirectly connected to other vehicle devices such the interface 16, the supply mechanism 20, and the sensing device 22 using one or more network connections and/or communications bus. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Control module 14 may be used to control, govern, or otherwise manage certain operations or functions of vehicle 10, and/or one or more components or modules thereof. In an exemplary embodiment, control module 14 is a body control module having a processor 24 and memory 28. Processor 24 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory 28 may include any type of suitable electronic memory means and may store a variety of data and information. This includes, for example: sensed values or parameters; look-up tables and other data structures; software, firmware, programs, algorithms, scripts, and other electronic instructions; component characteristics and background information, etc. The disclosed method—as well as any other electronic instructions and/or information needed for such tasks—may also be stored or otherwise maintained in memory 28 such that control module 14 may be configured to perform one or more steps of the method described in greater detail below. These are, of course, only some of the possible arrangements, functions, and capabilities of control module 14, as others are certainly possible. Depending on the particular embodiment, control module 14 may be a stand-alone electronic module (e.g., a body control module), it may be incorporated or included within another electronic module in the vehicle (e.g., an engine control module, a hybrid control module, etc.), or it may be part of a larger network or system.

Interface 16 enables the exchange of information or data with the driver and/or other occupants of vehicle 10. The interface 16 may include any combination of visual, audio, haptic and/or other types of components for doing so. Interface 16 may be a stand-alone module or may be part of an infotainment system or part of some other module, device, or system in the vehicle. Depending on the particular embodiment, interface 16 may include an input/output device that can both receive information from and provide information to the vehicle occupants (e.g., a touch-screen display on a center stack/console or a voice-recognition human-machine interface (HMI)), or a combination of input devices (e.g., steering-wheel mounted switches or a microphone) and output devices (e.g., a speaker, an instrument panel gauge, or a visual indicator on the rear-view mirror), or some other component. Through interface 16, a vehicle occupant may receive information regarding one or more vehicle systems.

The reservoir 18 is used to store fluids for various vehicle purposes and is located in a vehicle compartment having a cover that provides access to the reservoir 18. It should be appreciated that the reservoir 18 is to be construed broadly to include any type of containment structure or receptacle that holds, stores, distributes, and/or delivers any type of vehicle fluid from the reservoir 18 to other vehicle components or structures. For example, the reservoir 18 may include, without limitation, a washer fluid reservoir, a gasoline reservoir, and a radiator fluid reservoir, to name but a few. The reservoir 18 is generally located in an engine compartment 30 of the vehicle 10 underneath a hood 32 as shown in FIG. 1; however, it should be appreciated that the reservoir 18 can be located in any other suitable vehicle compartment.

The supply mechanism 20 is generally a device or system that fluidly couples the reservoir 18 to other vehicle components designed to receive the fluid contained therein. The supply mechanism 20 is fluidically coupled to the reservoir 18 and to the other vehicle components that consume and/or utilize the fluid through a plurality of conduits such as, for example, pipes and/or hoses that transport the fluid. In operation, the supply mechanism 20 extracts the fluid from the reservoir 18 and delivers the fluid to the vehicle components (e.g., windshield wipers, engine, etc.) according to known methods.

In one embodiment, the supply mechanism 20 includes a processor or control unit that controls a pump configured to move the fluids by mechanical action from the reservoir 18 via conduit supply lines to other vehicle components. Although the supply mechanism 20 is schematically shown here as being integrated into a single unit, it should be appreciated that the control unit and pump may be separate devices that are attached to one another and connected by some type of communication means, or some other arrangement known in the art. In an exemplary embodiment, the supply mechanism 20 receives command signals from control module 14 and/or some other module or device, and drives the associated pump accordingly. The supply mechanism 20 can be electronically connected to control module 14 and/or other modules via a direct electronic connection, a vehicle communications network like a private controller area network (CAN) bus or high-speed local area network (LAN), or with some other communications medium. One of ordinary skill in the art appreciates that, depending on the particular arrangement, the supply mechanism 20 may include any combination of solenoids, valves, pumps, and other devices that can be controlled by electronic command signals and that can manipulate the fluid in reservoir 18. In addition, one of ordinary skill in the art appreciates that the amount of fluid expelled from the supply mechanism, and the rate at which the fluid is expelled (i.e., "flow rate"), varies depending on the characteristics of the supply mechanism 20 and the conduits connecting the reservoir 18 to the supply mechanism 20 and/or the designated vehicle components coupled thereto. For example, the flow rate may depend on the power capacity of the supply mechanism, the size (e.g., diameter) of the connecting conduits, and/or the characteristics of fluid being transported. In one embodiment a flow rate calculation may take into consideration fluid characteristics such as, for example, the viscosity of the fluid. In one embodiment, the supply mechanism 20 may also include one or more sensors configured to measure the flow rate of the fluid being expelled from the supply mechanism 20 and/or other operational parameters relating to the fluid flow from the reservoir 18.

Sensing device 22 may be a single sensor or a combination of sensors that may be used alone, or in conjunction with other sensors. Sensing device 22 may be embodied in hardware, software, firmware, or some combination thereof, and may be directly coupled to control module 14, indirectly coupled via other electronic devices, a vehicle communications bus, network, etc., or coupled according to some other arrangement known in the art. Sensing device 22 may directly sense or measure the conditions for which it is provided, or may indirectly evaluate such conditions based on information provided by other sensors, components, devices, modules, systems, etc.

In the embodiments disclosed herein, sensing device 22 is configured to detect a position of a vehicle compartment cover, and more specifically, to detect an open and/or a closed position of the compartment cover, which in the non-limiting example shown in FIG. 1, is a vehicle hood 32. In one embodiment, the vehicle hood 32 may be a hinged cover that allows for access to the engine compartment (or trunk on rear-engine and some mid-engine vehicles) for maintenance and repair. The vehicle hood 32 may be held down by a concealed latch designed to protect a vehicle from thefts, damage, and sudden hood opening on the road. A hood release system (not shown) may be used to release the hood 32 and may include an interior hood latch handle, a hood release cable, and/or hood latch assembly. The hood latch handle may be located, for example, below the steering wheel, beside the driver's seat or set into the door frame. When a vehicle occupant pulls a hood latch handle the vehicle hood panel 32 opens and allows access to the engine compartment.

In addition to detecting a state of being opened and/or closed, the sensing device 2 may also be configured to determine a degree to which the vehicle hood 32 is opened and/or closed. For example, the hood release system may be activated to release the hood latching mechanism, but the vehicle hood 32 may not be opened far enough to allow access to the engine compartment. Therefore, the sensing device 22 may also be configured to detect a degree to which the vehicle hood is opened.

The sensing device 22 in FIG. 1 is located at the front end of the vehicle 10; however, it should be appreciated that the sensing device 22 may be disposed at any location along the vehicle compartment suitable for detecting the position of the compartment cover. The sensing device 22 may also be equipped with a timing feature for determining an amount of time that the compartment cover is in a particular position. For example, the timing feature may be used to determine a time period for which the compartment cover is in an open state, and/or how long the cover is been between open states, and/or between open and closed states. The timing feature may also be implemented in control module 14 based on the signals and/or data received from the sensing device 22.

Method—

FIG. 2 illustrates a method 100 for estimating fluid levels in reservoirs, and more specifically, for estimating fluid levels in reservoirs without the use of dedicated reservoir sensors. The method 100 set forth below is implemented using the system described above with respect to FIG. 1, wherein a reservoir is disposed in a vehicle compartment having a compartment cover. It should be understood that the steps of the method 100 are not necessarily presented in any particular order and that performance of some or all the steps in an alternative order is possible and is contemplated. The method 100 begins at 102 by monitoring at least one operational parameter associated with the reservoir 18 and monitoring a state of the compartment cover 32. In one embodiment, the operational parameters may relate to characteristics of the supply mechanism 20, the size of connecting conduit, and the type of fluid in the reservoir 18.

At step 104, the method detects a triggering event, which indicates that the fluid in the reservoir 18 is being expelled and/or replenished. The triggering event may be based on the at least one operational parameter, the state of the compartment cover 32, or both. In one embodiment, the triggering event is an activation of the supply mechanism 20 and/or a threshold transition cycle, which relates to a transition of the compartment cover 32 from a closed position to an open position and back to a closed position, and more particularly, wherein the compartment cover 32 remains in the open position for a minimum threshold period of time.

In response to detecting the activation of the supply mechanism 20, at step 106 the method determines an estimate for an amount of fluid in the reservoir 18 based on data relating to the operational parameters associated with the supply mechanism 20 and the activation thereof. In one embodiment, determining the estimate for the amount of fluid in the reservoir 18 includes calculating an estimated amount of fluid expelled from the reservoir 18 during the activation of the supply mechanism 20. The amount of fluid expelled from the reservoir 18 during the activation of the supply mechanism 20 may be determined based on a combination of the operational characteristics of the supply mechanism 20, the size of conduit connecting the reservoir 18 to the supply mechanism 20, one or more fluid characteristics, and an activation time of the supply mechanism 20. In one embodiment, the estimated remaining fluid in the reservoir 18 is determined by reducing a last known estimate for the amount of fluid in the reservoir 18 by the amount of fluid expelled from the reservoir during the activation of the supply mechanism 20.

In response to detecting a threshold transition cycle that exceeds the minimum opening time criteria (i.e., threshold period of time), at step 108 the method determines an estimate for an amount of fluid in the reservoir 18 by setting the estimated amount of fluid in the reservoir 18 equal to the reservoir capacity. Otherwise, if the minimum opening time criterion is not met, the reservoir capacity is not reset.

In one embodiment, prior to setting the estimated amount of fluid in the reservoir 18 equal to the reservoir capacity, the method may request confirmation from the vehicle occupant that the fluid in the reservoir 18 was replenished in response to detecting the threshold transition cycle. In this case, the estimated amount of fluid in the reservoir is set equal to the reservoir capacity when confirmation is received from the vehicle occupant that the fluid in the reservoir 18 was replenished.

At step 110, the method initiates a notification to the vehicle occupant when the estimated amount of fluid in the reservoir 18 is less than or equal to a low level threshold. The notification may be delivered or conveyed in any number of different ways, as step 110 is not limited to any particular one. For example, the control module 14 may send an alert signal via a vehicle bus to one or more visual and/or audible indicators within the vehicle cabin through interface 16. Some suitable indicators may include visual displays like flashing lights, textual messages on a display, projected warnings on a corner of the windshield, etc., and some suitable audible indicators may include chimes, audio warnings over the vehicle radio, muting the radio, etc. In one embodiment, the method includes multiple notification and/or warning levels, which may include specific display and/or audio strategies for each notification level.

The method may further include a second low level threshold, wherein a second notification is sent to the vehicle occupant when the estimated amount of fluid in the reservoir 18 is less than or equal to the second low level threshold. The second notification may also be dependent upon receipt of confirmation from the vehicle occupant that the fluid in the reservoir 18 was replenished in step 108.

In one embodiment, the method may also operate under a fail-soft strategy if the control module 14 detects a failure in the sensor device 22. A sensor device 22 failure may be detected by any known techniques, and may indicate, for example, a communication error, a sensor malfunction, or a connection failure, to name a few. In one example, the fail-soft strategy may assume that the compartment cover 32 has not been opened since the time that the sensor device 22 failure was detected, and continue to decrement the reservoir capacity as set forth above when activation of the supply mechanism 20 is detected. Alternatively, upon detection of a sensor device 22 failure, the method may send a notification to the vehicle occupant that the fluid reservoir monitoring system has been temporarily disabled. It should be appreciated that other fail-soft strategies may be implemented according to known methods.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for estimating a fluid level in a reservoir disposed in a vehicle compartment and accessible via a compartment cover, the method comprising the steps of:
   monitoring at least one operational parameter relating to the reservoir;
   monitoring a state of the compartment cover using a sensing device;
   detecting a triggering event based on the at least one operational parameter, the state of the compartment cover, or both;
   in response to the triggering event, determining an estimate for an amount of fluid in the reservoir based on data related to the triggering event; and
   initiating a notification to a vehicle occupant when the estimated amount of fluid in the reservoir is less than or equal to a low level threshold.

2. The method of claim 1, wherein the at least one operational parameter relates to a supply mechanism coupled to, and configured to extract fluid from, the reservoir.

3. The method of claim 2, wherein detecting the triggering event includes detecting an activation of the supply mechanism, and wherein the data relating to the triggering event includes information relating to the fluid being expelled from the reservoir during activation of the supply mechanism.

4. The method of claim 3, wherein determining the estimate for the amount of fluid in the reservoir includes calculating an estimated amount of fluid expelled from the reservoir during the activation of the supply mechanism.

5. The method of claim 4, wherein determining the estimate for the amount of fluid in the reservoir further includes reducing a last known estimate for the amount of fluid in the reservoir by the amount of fluid expelled from the reservoir during the activation of the supply mechanism.

6. The method of claim 5, wherein the amount of fluid expelled from the reservoir during the activation of the supply mechanism is determined based a combination of the operational characteristics of the supply mechanism, the size of conduit connecting the reservoir to the supply mechanism, and one or more fluid characteristics.

7. The method of claim 5, wherein the amount of fluid expelled from the reservoir during the activation of the supply mechanism is determined based on an activation time of the supply mechanism and a flow rate of the fluid.

8. The method of claim 2, wherein the supply mechanism is a pumping device.

9. The method of claim 1, wherein monitoring the state of the compartment cover includes detecting a closed position, an open position, and transitions therebetween.

10. The method of claim 9, wherein monitoring the state of the compartment cover further includes detecting a threshold transition cycle between the closed and open positions of the compartment cover.

11. The method of claim 10, wherein detecting the triggering event includes detecting a threshold transition cycle, and wherein determining the estimate for the amount of fluid in the reservoir includes setting the estimated amount of fluid in the reservoir equal to the reservoir capacity.

12. The method of claim 10, further including requesting confirmation from the vehicle occupant that the fluid in the reservoir was replenished in response to detecting the threshold transition cycle.

13. The method of claim 12, wherein determining the estimate for the amount of fluid in the reservoir includes setting the estimated amount of fluid in the reservoir equal to the reservoir capacity in response to receiving confirmation from the vehicle occupant that the fluid in the reservoir was replenished.

14. The method of claim 1, wherein initiating the notification to a vehicle occupant includes providing an audio notification, a textual notification, or both, to the vehicle occupant.

15. The method of claim 1, wherein the vehicle compartment is an engine compartment and the compartment cover is a vehicle hood.

16. A method for estimating a fluid level in a reservoir disposed in a vehicle compartment and accessible via a compartment cover, the method comprising the steps of:

detecting an activation of a supply mechanism coupled to the reservoir and configured to expel the fluid therefrom;

detecting a threshold transition cycle between a closed position and an open position of the compartment cover;

determining an estimate for an amount of fluid in the reservoir in response to detecting the activation of the supply mechanism, detecting the threshold transition cycle, or both;

initiating a notification to a vehicle occupant when the estimated amount of fluid in the reservoir is less than or equal to a low level threshold.

17. The method of claim 16, wherein determining the estimate for the amount of fluid in the reservoir includes calculating an estimated amount of fluid expelled from the reservoir during the activation of the supply mechanism and reducing a last known estimate for the amount of fluid in the reservoir by the estimated amount of expelled fluid.

18. The method of claim 16, wherein determining the estimate for the amount of fluid in the reservoir includes setting the estimated amount of fluid in the reservoir equal to the reservoir capacity in response to detecting the threshold transition cycle.

19. A system for estimating a fluid level in a reservoir disposed in a vehicle compartment and accessible via a compartment cover, the system comprising:

a supply mechanism coupled to the reservoir and configured to expel the fluid therefrom;

a sensing device configured to monitor a state of the compartment cover;

at least one vehicle control module communicatively coupled to the sensing device and to the supply mechanism and configured to:

detect an activation of the supply mechanism;

detect a threshold transition cycle between a closed position and an open position of the compartment cover;

determine an estimate for an amount of fluid in the reservoir in response to detecting the activation of the supply mechanism, detecting the threshold transition cycle, or both;

initiate a notification to a vehicle occupant when the estimated amount of fluid in the reservoir is less than or equal to a low level threshold.

20. The system of claim 19, wherein determining the estimate for the amount of fluid in the reservoir includes calculating an estimated amount of fluid expelled from the reservoir during the activation of the supply mechanism and reducing a last known estimate for the amount of fluid in the reservoir by the estimated amount of expelled fluid.

21. The system of claim 19, wherein determining the estimate for the amount of fluid in the reservoir includes setting the estimated amount of fluid in the reservoir equal to the reservoir capacity in response to detecting the threshold transition cycle.

* * * * *